(12) United States Patent
Lopez-Julia et al.

(10) Patent No.: US 12,140,278 B2
(45) Date of Patent: Nov. 12, 2024

(54) OPTICAL FILTERS COMPENSATING FOR CHANGES IN PERFORMANCE OF NEXT GENERATION LEDS COMPARED TO LEGACY DEVICES

(71) Applicant: LUMILEDS LLC, San Jose, CA (US)

(72) Inventors: Antonio Lopez-Julia, Aachen (DE); Thomas Diederich, Stolberg (DE); Rémi Guillebot, Aachen (DE); Aimi Abass, Aachen (DE); Niels Jeroen van der Veen, Aachen (DE)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 18/680,049

(22) Filed: May 31, 2024

(65) Prior Publication Data
US 2024/0318793 A1      Sep. 26, 2024

Related U.S. Application Data

(63) Continuation of application No. PCT/US2022/049942, filed on Nov. 15, 2022.

(60) Provisional application No. 63/286,196, filed on Dec. 6, 2021.

(51) Int. Cl.
*F21K 9/64*        (2016.01)
*F21Y 115/10*     (2016.01)

(52) U.S. Cl.
CPC ............. *F21K 9/64* (2016.08); *F21Y 2115/10* (2016.08)

(58) Field of Classification Search
CPC .......... H01L 33/46; G01J 3/0227; F21K 9/61; F21Y 115/10
See application file for complete search history.

(56) References Cited

U.S. PATENT DOCUMENTS

| 5,813,752 A * | 9/1998 | Singer | H01L 33/46 |
| | | | 257/97 |
| 6,956,247 B1 * | 10/2005 | Stockman | H01L 33/50 |
| | | | 257/E33.071 |
| 8,125,634 B1 * | 2/2012 | Nikitin | G01J 1/429 |
| | | | 356/417 |

FOREIGN PATENT DOCUMENTS

| WO | 2013049248 A2 | 4/2013 |
| WO | 2013049248 A3 | 4/2013 |

OTHER PUBLICATIONS

From the EPO as the ISA, "Notification of Transmittal of the International Search Report and the Written Opinion of the International Searching Authority, or the Declaration", PCT/US2022/049942, Feb. 24, 2023, 10 pages.

* cited by examiner

*Primary Examiner* — William J Carter

(57) ABSTRACT

Optical filters are used to compensate for changes in LED and pcLED performance resulting from technological advances in device design or manufacturing, with for example the filtered optical output from later generation devices matching or substantially matching the optical performance of earlier generation legacy devices. This can allow the advanced generation devices to be substituted in applications previously supported by the legacy devices, even if the optical performance of the unfiltered advanced generation devices does not satisfy the optical performance specifications required by the application. Somewhat paradoxically, the advantages of using the filters in combination with the advanced generation devices may arise from the filters making the optical performance of the devices worse according to one or more figures of merit.

20 Claims, 9 Drawing Sheets

OPTICAL FILTERS COMPENSATING FOR CHANGES IN PERFORMANCE OF NEXT GENERATION LEDS COMPARED TO LEGACY DEVICES

CROSS-REFERENCE TO RELATED APPLICATIONS

This application is a continuation of PCT Application PCT/US2022/049942 filed Nov. 15, 2022, which claims benefit of priority to U.S. Provisional Patent Application No. 63/286,196 filed Dec. 6, 2021. Both of the applications above are incorporated herein by reference in their entirety.

FIELD OF THE INVENTION

The invention relates generally to semiconductor LEDs and pcLEDs, LED and pcLED arrays, light sources comprising LED and pcLED arrays, and displays comprising LED and pcLED arrays.

BACKGROUND

Semiconductor light emitting diodes and laser diodes (collectively referred to herein as "LEDs") are among the most efficient light sources currently available. The emission spectrum of an LED typically exhibits a single narrow peak at a wavelength determined by the structure of the device and by the composition of the semiconductor materials from which it is constructed. By suitable choice of device structure and material system, LEDs may be designed to operate at ultraviolet, visible, or infrared wavelengths.

LEDs may be combined with one or more wavelength converting materials (generally referred to herein as "phosphors") that absorb light emitted by the LED and in response emit light of a longer wavelength. For such phosphor-converted LEDs ("pcLEDs"), the fraction of the light emitted by the LED that is absorbed by the phosphors depends on the amount of phosphor material in the optical path of the light emitted by the LED, for example on the concentration of phosphor material in a phosphor layer disposed on or around the LED and the thickness of the layer. Phosphor-converted LEDs may be designed so that all the light emitted by the LED is absorbed by one or more phosphors, in which case the emission from the pcLED is entirely from the phosphors. In such cases the phosphor may be selected, for example, to emit light in a narrow spectral region that is not efficiently generated directly by an LED. Alternatively, pcLEDs may be designed so that only a portion of the light emitted by the LED is absorbed by the phosphors, in which case the emission from the pcLED is a mixture of light emitted by the LED and light emitted by the phosphors. By suitable choice of LED, phosphors, and phosphor composition, such a pcLED may be designed to emit, for example, white light having a desired color temperature and desired color-rendering properties.

Technological and business applications of LEDs and pcLEDs include use in displays, matrices and light engines including automotive adaptive headlights, augmented-reality (AR) displays, virtual-reality (VR) displays, mixed-reality (MR) displays, smart glasses and displays for mobile phones, smart watches, monitors and TVs, and flash illumination for cameras in mobile phones. The individual LED pixels in these architectures can have an area of a few square millimeters down to a few square micrometers depending on the matrix or display size and its pixel per inch requirements. LED matrices/displays may for example be realized by transfer and attachment of individual pixels from a donor substrate to a controller backplane or electronic board or be created by a monolithic approach where a monolithically integrated array of LED pixels is processed into an LED module on a donor epitaxial wafer and then transferred and attached to a controller backplane.

The optical designs for such applications generally assume specific optical performance characteristics (e.g., angular radiation intensity patterns and flux levels) from their constituent LEDs and pcLEDs. As LED and pcLED technology improves, later generation LEDs and pcLEDs may outperform earlier generations, or otherwise perform differently, and consequently not satisfy optical performance specifications previously satisfied by the earlier generation legacy LEDs and pcLEDs. This can require continued production of the earlier generation LEDs and pcLEDs, in parallel with the later generation, to support applications requiring optical performance specifications satisfied by the legacy LEDs and pcLEDs and not by the later generations. This increases manufacturing complexity and cost.

SUMMARY

This specification discloses the use of optical filters to compensate for changes (for example, improvements) in LED and pcLED performance resulting from technological advances in device design or manufacturing. In combination with the optical filters, the later generation LEDs and pcLEDs produce an optical output compatible with optical specifications satisfied by earlier legacy generations of LEDs and pcLEDs but not satisfied by the (unfiltered) later generation LEDs and pcLEDs. This allows the later generation LEDs and pcLEDs in combination with such a filter to be substituted for legacy LEDs and pcLEDs in applications previously supported by the legacy LEDs and pcLEDs.

Somewhat paradoxically, the advantages of using the filter in combination with the next generation LED or pcLED may arise from the filter making the optical performance of the device worse according to one or more figures of merit.

In one aspect of the invention, a method comprises obtaining angle and wavelength dependent flux data characterizing a light output radiation intensity pattern through a light output surface of a first light emitting device during operation of the first light emitting device. The first light emitting device comprises a light emitting semiconductor diode structure and a wavelength converting structure. The method also comprises obtaining angle and wavelength dependent flux data characterizing a light output radiation intensity pattern through a light output surface of a second light emitting device during operation of the second light emitting device. The second light emitting device comprises another light emitting semiconductor diode structure and another wavelength converting structure.

Generally, this specification uses the term "flux" to refer to "luminous flux." One of ordinary skill in the art will recognize that "luminous flux" is obtained by weighting radiant flux by the wavelength dependent sensitivity of a normal human eye (i.e., with the luminosity function). Hence "flux" as used herein may also be understood to refer to radiant flux.

The first light emitting device may be for example a legacy LED or pcLED and the second light emitting device may be for example an improved LED or pcLED, as discussed above.

The method further comprises determining or having another determine angle and wavelength dependent transmission properties characterizing an optical filter configured to filter the light output radiation intensity pattern of the second light emitting device to provide a filtered light output radiation intensity pattern characterized by angle and wavelength dependent flux data matching the angle and wavelength dependent flux data characterizing the light output radiation intensity pattern of the first light emitting device, and manufacturing or having another manufacture an interferometric photonic bandgap filter having the determined angle and wavelength dependent transmission properties.

The filtered light output radiation intensity pattern may have a total flux that is reduced compared to that of the light output radiation intensity pattern of the second light emitting device.

The filtered light output radiation intensity pattern may have a full width at half maximum angle that is increased, decreased, or about the same compared to that of the light output radiation intensity pattern of the second light emitting device. The filtered light output radiation intensity pattern may have a full width at half maximum angle that is for example within +/−15 degrees of the light output radiation intensity pattern of the second light emitting device.

The filtered light output radiation intensity pattern may have a forward gain that is increased or decreased compared to that of the light output radiation intensity pattern of the second light emitting device. The filtered light output radiation intensity pattern may have a forward gain that that is for example within +/−25% of that of the light output radiation intensity pattern of the second light emitting device. Forward gain is the fraction of light output power from the device within a certain cone angle centered on an axis perpendicular to the light output surface along the peak power direction of the output. In what follows, we use a cone angle of 45 degrees, i.e., 45 degree forward gain.

The filtered light output radiation intensity pattern may have an increased or a decreased uniformity of color over angle compared to that of the light output radiation intensity pattern of the second light emitting device. Color over angle is the color point (x, y) in a color space of the output emission as a function of output angle of emission. For practical reasons, color over angle is typically assessed at angles restricted to ≤80 degrees from the normal. For this specification, the chromaticity diagram (color space) of reference is the CIE1931 color space. The filtered light output radiation intensity pattern may have color over angle within for example +/−40 points of that of the light output radiation intensity pattern of the second light emitting device at all angles.

In another aspect of the invention, a light emitting device comprises a light emitting semiconductor diode structure, a wavelength converting structure disposed on a light output surface of the semiconductor diode structure, and an interferometric photonic bandgap filter disposed in an optical path of light output through a light output surface of the wavelength converting structure during operation of the light emitting device.

The interferometric photonic bandgap filter is characterized by spectral transmission characteristics that vary with wavelength through the visible spectrum and with angle with respect to a normal to a plane of the light output surface of the wavelength converting structure to, during operation of the light emitting device: increase the full width at half maximum of an angular radiation intensity pattern of light output from the light emitting device, or decrease the forward gain of an angular radiation intensity pattern of light output from the light emitting device, or decrease uniformity of color over angle of light output from the light emitting device, or any combination thereof, compared to an otherwise identical light emitting device lacking the interferometric photonic bandgap filter.

Optical filters in combination with LEDs, pcLEDs, and arrays as disclosed herein may be advantageously employed in various of the devices and applications listed above in the Background section.

The use of optical filters to compensate for changes or improvements in LED or pcLED optical performance, as described above, may simplify manufacturing due to reduced production flow, lower manufacturing costs, enable obsolescence of legacy products, enable rationalization of manufacturing footprint, lower inventor costs, and facilitate customer acceptance of latest technology generations as drop-in replacements by providing matching emitter characteristics including flux levels and angular radiation profiles.

These and other embodiments, features and advantages of the present invention will become more apparent to those skilled in the art when taken with reference to the following more detailed description of the invention in conjunction with the accompanying drawings that are first briefly described

DETAILED DESCRIPTION

The following detailed description should be read with reference to the drawings, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention.

Figure 1:
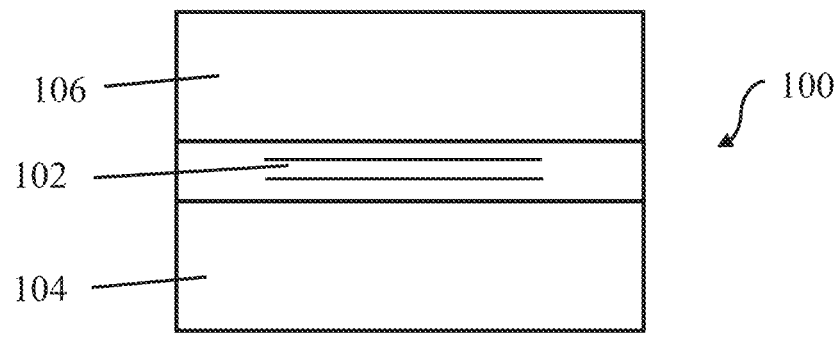
FIG. 1 shows a schematic cross-sectional view of an example pcLED.

FIG. 1 shows an example of an individual pcLED 100 comprising a light emitting semiconductor diode (LED) structure 102 disposed on a substrate 104, and a phosphor layer 106 (also referred to herein as a wavelength converting structure) disposed on the LED. Light emitting semiconductor diode structure 102 typically comprises an active region disposed between n-type and p-type layers. Application of a suitable forward bias across the diode structure results in emission of light from the active region. The wavelength of the emitted light is determined by the composition and structure of the active region.

The LED may be, for example, a III-Nitride LED that emits ultraviolet, blue, green, or red light. LEDs formed from any other suitable material system and that emit any other suitable wavelength of light may also be used. Other suitable material systems may include, for example, III-Phosphide materials, III-Arsenide materials, and II-VI materials.

Any suitable phosphor materials may be used, depending on the desired optical output and color specifications from the pcLED.

Figure 2A:
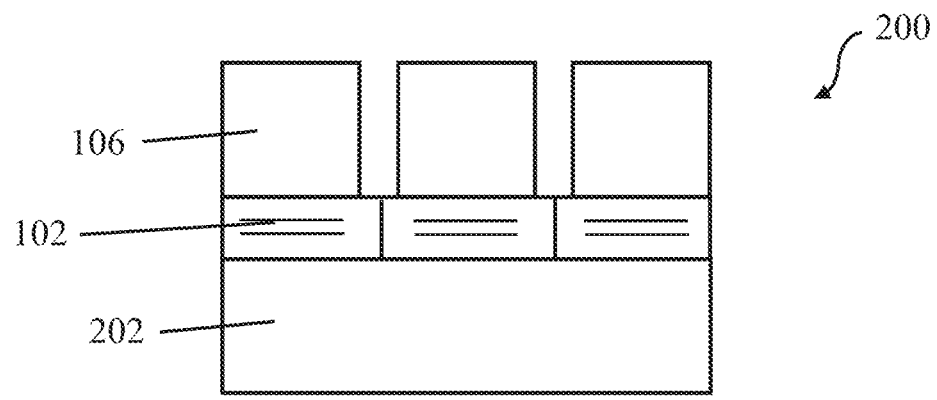
FIGS. 2A and 2B show, respectively, cross-sectional and top schematic views of an array of pcLEDs.
Figure 2B:
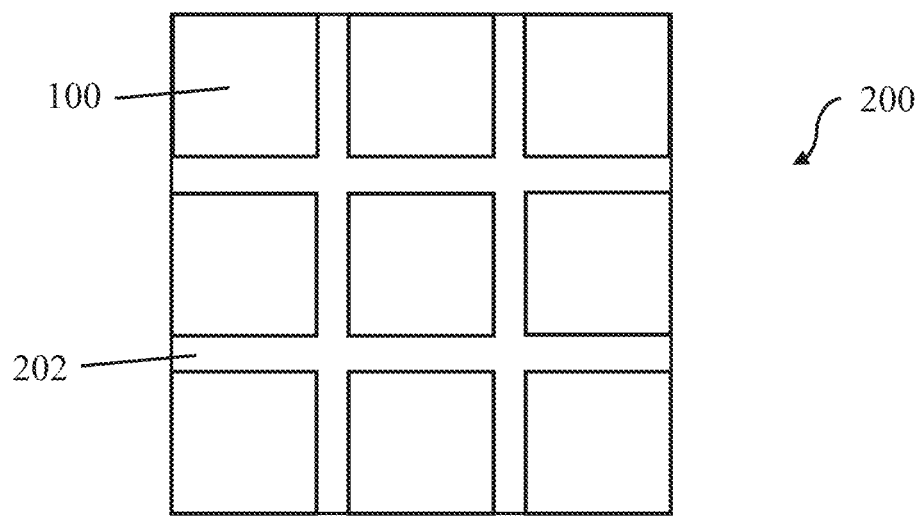

FIGS. 2A-2B show, respectively, cross-sectional and top views of an array 200 of pcLEDs 100 including phosphor pixels 106 disposed on a substrate 202. Such an array may include any suitable number of pcLEDs arranged in any suitable manner. In the illustrated example the array is depicted as formed monolithically on a shared substrate, but alternatively an array of pcLEDs may be formed from separate individual pcLEDs. Substrate 202 may optionally comprise CMOS circuitry for driving the LED and may be formed from any suitable materials.

Although FIGS. 2A-2B show a three-by-three array of nine pcLEDs, such arrays may include for example tens, hundreds, or thousands of LEDs. Individual LEDs (pixels) may have widths (e.g., side lengths) in the plane of the array, for example, less than or equal to 1 millimeter (mm), less than or equal to 500 microns, less than or equal to 100 microns, or less than or equal to 50 microns. LEDs in such an array may be spaced apart from each other by streets or lanes having a width in the plane of the array of, for example, hundreds of microns, less than or equal to 100 microns, less than or equal to 50 microns, less than or equal to 10 microns, or less than or equal to 5 microns. Although the illustrated examples show rectangular pixels arranged in a symmetric matrix, the pixels and the array may have any suitable shape or arrangement.

LEDs having dimensions in the plane of the array (e.g., side lengths) of less than or equal to about 50 microns are typically referred to as microLEDs, and an array of such microLEDs may be referred to as a microLED array.

An array of LEDs, or portions of such an array, may be formed as a segmented monolithic structure in which individual LED pixels are electrically isolated from each other by trenches and/or insulating material, but the electrically isolated segments remain physically connected to each other by portions of the semiconductor structure.

The individual LEDs in an LED array may be individually addressable, may be addressable as part of a group or subset of the pixels in the array, or may not be addressable. Thus, light emitting pixel arrays are useful for any application requiring or benefiting from fine-grained intensity, spatial, and temporal control of light distribution. These applications may include, but are not limited to, precise special patterning of emitted light from pixel blocks or individual pixels. Depending on the application, emitted light may be spectrally distinct, adaptive over time, and/or environmentally responsive. Such light emitting pixel arrays may provide pre-programmed light distribution in various intensity, spatial, or temporal patterns. The emitted light may be based at least in part on received sensor data and may be used for optical wireless communications. Associated electronics and optics may be distinct at a pixel, pixel block, or device level.

Figure 3A:
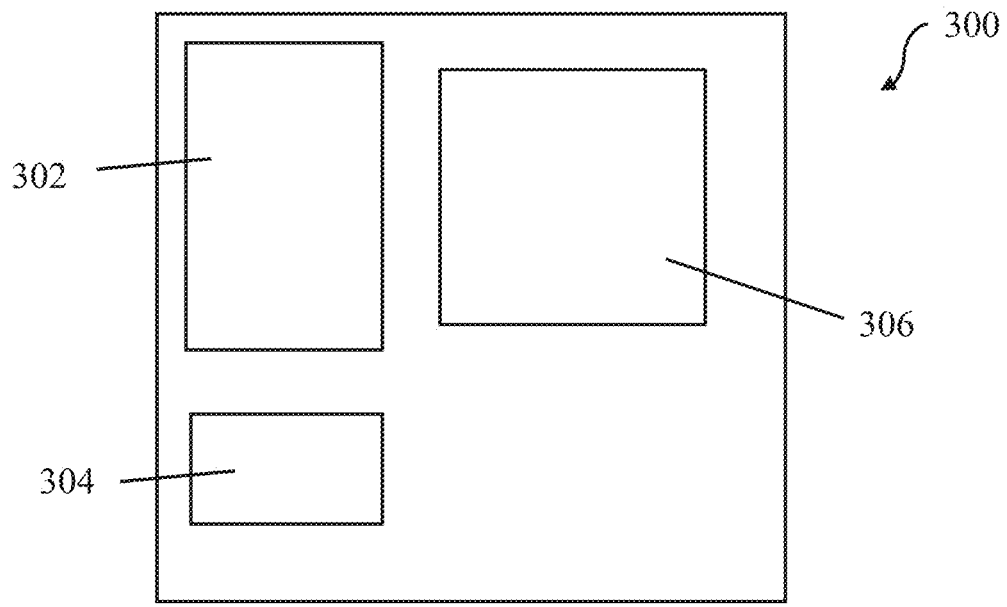
FIG. 3A shows a schematic top view of an electronics board on which an array of pcLEDs may be mounted, and FIG. 3B similarly shows an array of pcLEDs mounted on the electronic board of FIG. 3A.
Figure 3B:
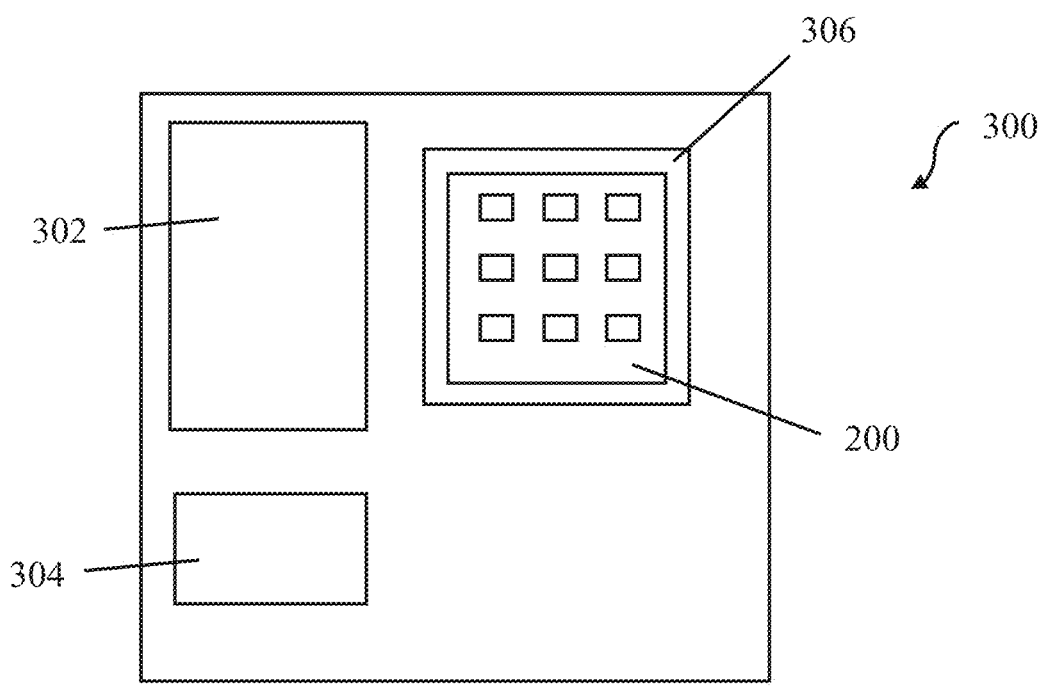

As shown in FIGS. 3A-3B, a pcLED array 200 may be mounted on an electronics board 300 comprising a power and control module 302, a sensor module 304, and an LED attach region 306. Power and control module 302 may receive power and control signals from external sources and signals from sensor module 304, based on which power and control module 302 controls operation of the LEDs. Sensor module 304 may receive signals from any suitable sensors, for example from temperature or light sensors. Alternatively, pcLED array 200 may be mounted on a separate board (not shown) from the power and control module and the sensor module.

Figure 4A:
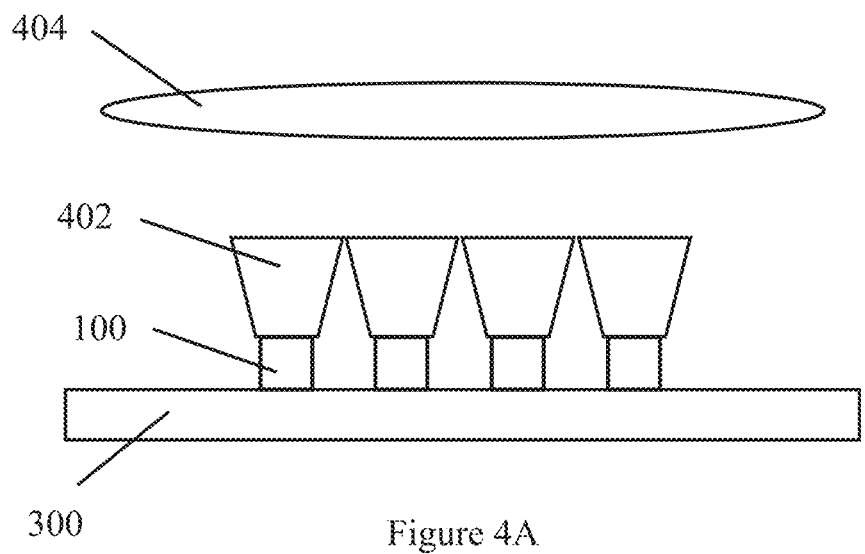
FIG. 4A shows a schematic cross-sectional view of an array of pcLEDs arranged with respect to waveguides and a projection lens.
Figure 4B:
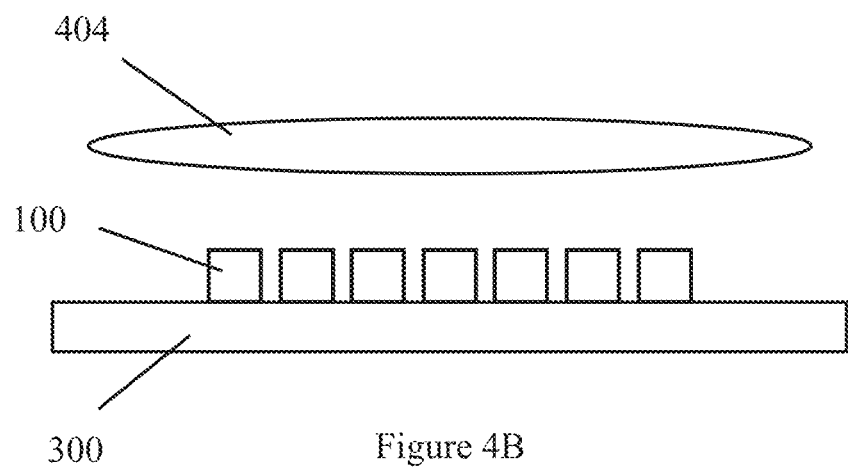
FIG. 4B shows an arrangement similar to that of FIG. 4A, without the waveguides.

Individual pcLEDs may optionally incorporate or be arranged in combination with a lens or other optical element located adjacent to or disposed on the phosphor layer. Such an optical element, not shown in the figures, may be referred to as a "primary optical element". In addition, as shown in FIGS. 4A-4B a pcLED array 200 (for example, mounted on an electronics board 300) may be arranged in combination with secondary optical elements such as waveguides, lenses, or both for use in an intended application. In FIG. 4A, light emitted by pcLEDs 100 is collected by waveguides 402 and directed to projection lens 404. Projection lens 404 may be a Fresnel lens, for example. This arrangement may be suitable for use, for example, in automobile headlights. In FIG. 4B, light emitted by pcLEDs 100 is collected directly by projection lens 404 without use of intervening waveguides. This arrangement may be particularly suitable when pcLEDs can be spaced sufficiently close to each other and may also be used in automobile headlights as well as in camera flash applications. A microLED display application may use similar optical arrangements to those depicted in FIGS. 4A-4B, for example. Generally, any suitable arrangement of optical elements may be used in combination with the LED arrays described herein, depending on the desired application.

An array of independently operable LEDs may be used in combination with a lens, lens system, or other optical system (e.g., as described above) to provide illumination that is adaptable for a particular purpose. For example, in operation such an adaptive lighting system may provide illumination that varies by color and/or intensity across an illuminated scene or object and/or is aimed in a desired direction. A controller can be configured to receive data indicating locations and color characteristics of objects or persons in a scene and based on that information control LEDs in an LED array to provide illumination adapted to the scene. Such data can be provided for example by an image sensor, or optical (e.g., laser scanning) or non-optical (e.g., millimeter radar) sensors. Such adaptive illumination is increasingly important for automotive, mobile device camera, VR, and AR applications.

Figure 5:
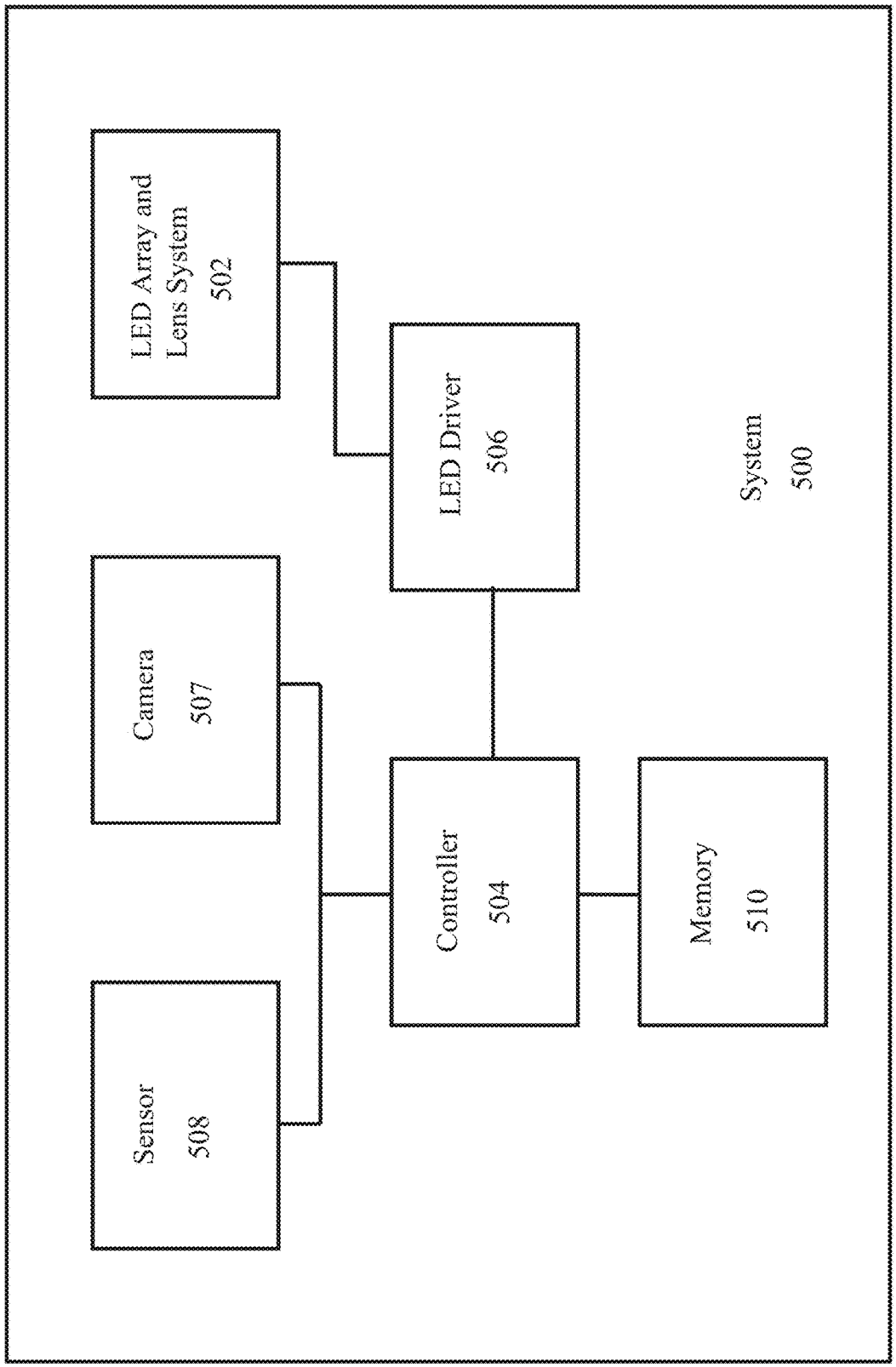
FIG. 5 schematically illustrates an example camera flash system comprising an adaptive illumination system.

FIG. 5 schematically illustrates an example camera flash system 500 comprising an LED array and lens system 502, which may be similar or identical to the systems described above. Flash system 500 also comprises an LED driver 506 that is controlled by a controller 504, such as a microprocessor. Controller 504 may also be coupled to a camera 507 and to sensors 508 and operate in accordance with instructions and profiles stored in memory 510. Camera 507 and adaptive illumination system 502 may be controlled by controller 504 to match their fields of view.

Sensors 508 may include, for example, positional sensors (e.g., a gyroscope and/or accelerometer) and/or other sensors that may be used to determine the position, speed, and orientation of system 500. The signals from the sensors 508 may be supplied to the controller 504 to be used to determine the appropriate course of action of the controller 504 (e.g., which LEDs are currently illuminating a target and which LEDs will be illuminating the target a predetermined amount of time later).

In operation, illumination from some or all pixels of the LED array in 502 may be adjusted-deactivated, operated at full intensity, or operated at an intermediate intensity. Beam focus or steering of light emitted by the LED array in 502 can be performed electronically by activating one or more subsets of the pixels, to permit dynamic adjustment of the beam shape without moving optics or changing the focus of the lens in the lighting apparatus.

Figure 6:
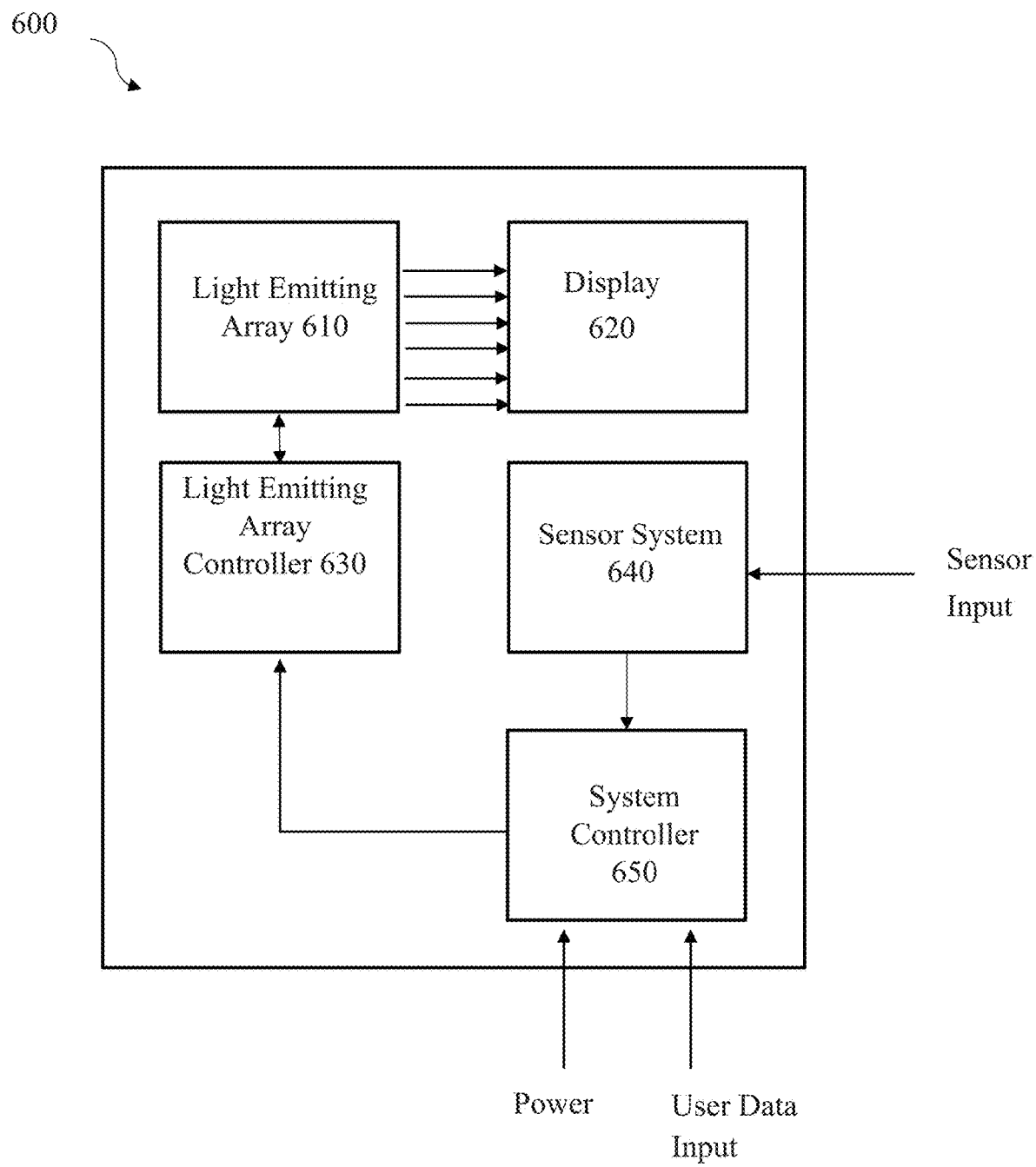
FIG. 6 schematically illustrates an example display (e.g., AR/VR/MR) system that includes an adaptive illumination system.

FIG. 6 schematically illustrates an example display (e.g., AR/VR/MR) system 600 that includes an adaptive light emitting array 610, display 620, a light emitting array controller 630, sensor system 640, and system controller 650. Control input is provided to the sensor system 640, while power and user data input is provided to the system controller 650. In some embodiments modules included in system 600 can be compactly arranged in a single structure, or one or more elements can be separately mounted and connected via wireless or wired communication. For example, the light emitting array 610, display 620, and sensor system 640 can be mounted on a headset or glasses, with the light emitting controller and/or system controller 650 separately mounted.

The light emitting array 610 may include one or more adaptive light emitting arrays, as described above, for example, that can be used to project light in graphical or object patterns that can support AR/VR/MR systems. In some embodiments, arrays of microLEDs can be used.

System 600 can incorporate a wide range of optics in adaptive light emitting array 610 and/or display 620, for example to couple light emitted by adaptive light emitting array 610 into display 620.

Sensor system 640 can include, for example, external sensors such as cameras, depth sensors, or audio sensors that monitor the environment, and internal sensors such as accelerometers or two or three axis gyroscopes that monitor an AR/VR/MR headset position. Other sensors can include but are not limited to air pressure, stress sensors, temperature sensors, or any other suitable sensors needed for local or remote environmental monitoring. In some embodiments, control input can include detected touch or taps, gestural input, or control based on headset or display position.

In response to data from sensor system 640, system controller 650 can send images or instructions to the light emitting array controller 630. Changes or modification to the images or instructions can also be made by user data input, or automated data input as needed. User data input can include but is not limited to that provided by audio instructions, haptic feedback, eye or pupil positioning, or connected keyboard, mouse, or game controller.

As summarized above, this specification discloses the use of optical filters to compensate for changes in LED and pcLED performance resulting from technological advances in device design or manufacturing, with for example the filtered optical output from later generation devices matching or substantially matching the optical performance of earlier generation legacy devices. Advantageously, this can allow the advanced generation devices to be substituted in applications previously supported by the legacy devices, even if the optical performance of the unfiltered advanced generation devices does not satisfy the optical performance specifications required by the application.

Figure 7:
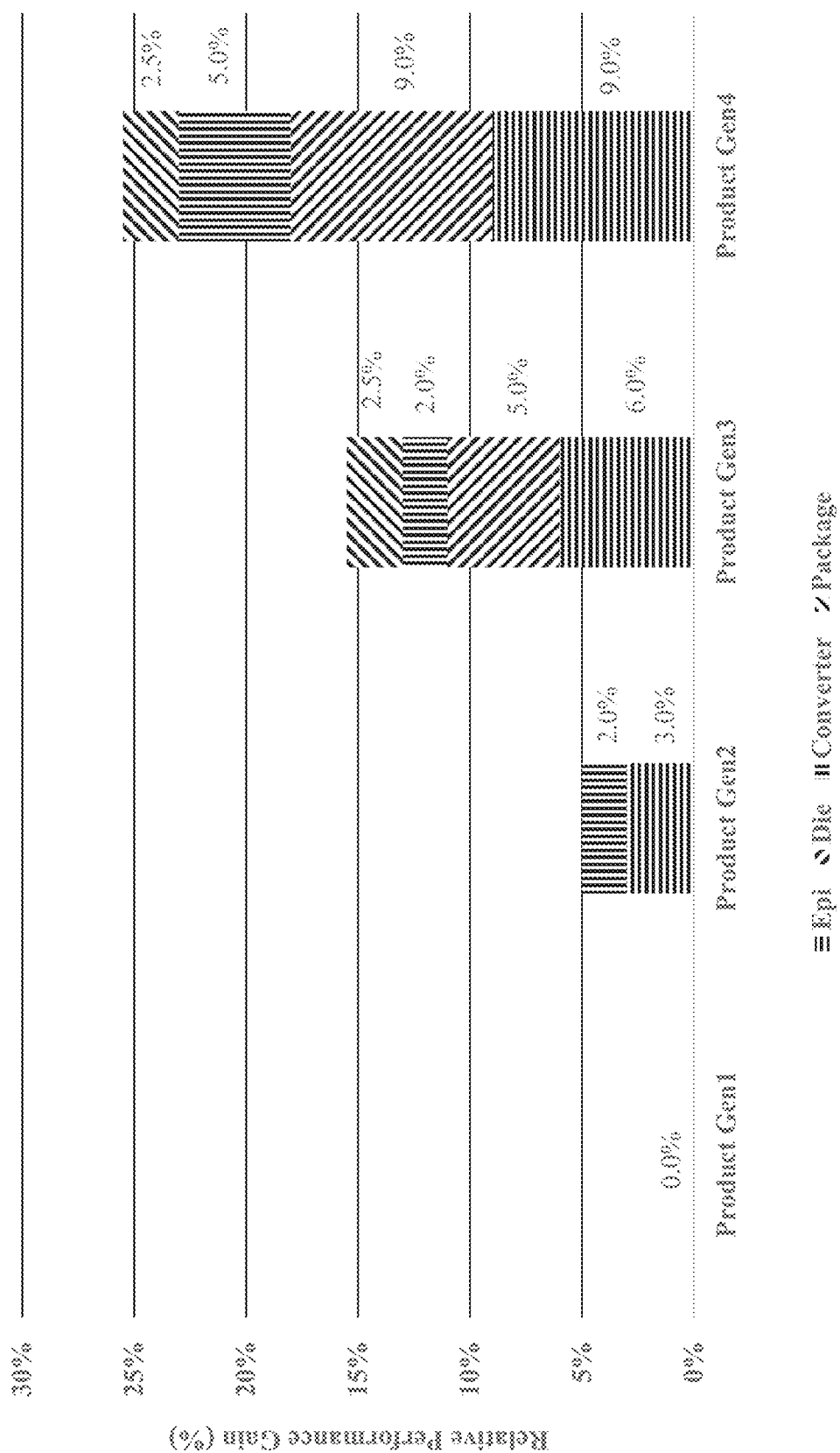
FIG. 7 schematically illustrates performance progress of LED products as new generations of technology building blocks are introduced.

FIG. 7 illustrates a typical performance progression that LED products may undergo as technology upgrades are introduced in the market. Four different technology building blocks are distinguished for most products: epi, die, wavelength converter block, and packaging. Gains exhibited by Product Gen2, Product Gen3, and Product Gen4 are shown in the FIG. 7 with respect to Product Gen1 and may refer generally to multiple performance metrics (e.g. flux and radiation intensity pattern characteristics). Technology upgrades used in product generations above Product Gen1 may not be compatible for use in legacy products due to issues matching performance targets.

Figure 8:
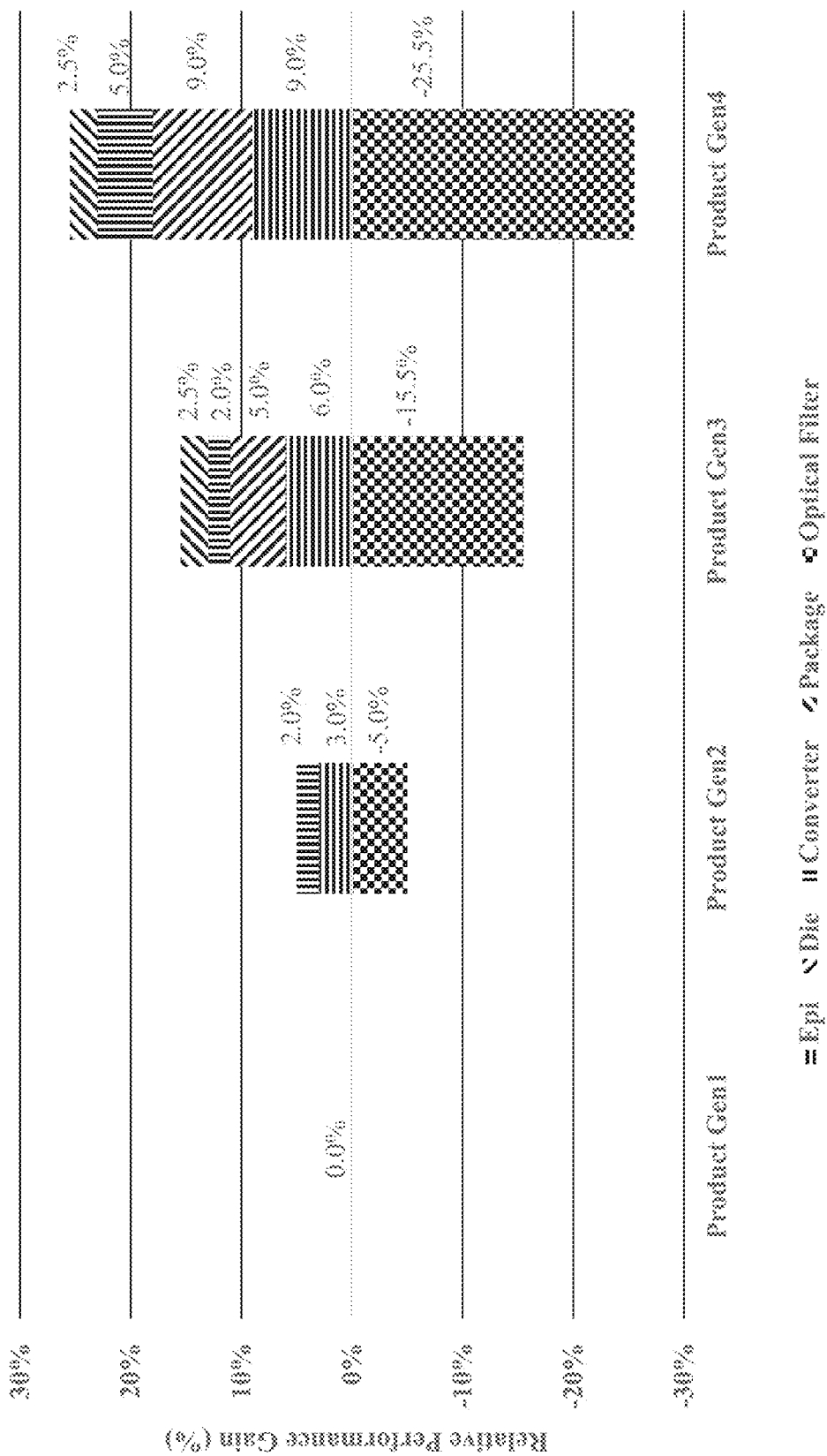
FIG. 8 schematically illustrates the effect of optical filters used as described herein to compensate for the performance progress illustrated in FIG. 7.

FIG. 8 illustrates the benefits of using optical filters in the manner described in this specification to make new technology generations compatible with legacy products. In this illustration, the optical filters essentially compensate for the performance changes of every technology upgrade to make them compatible with legacy products (e.g. Product Gen1 in this case).

Figure 9:
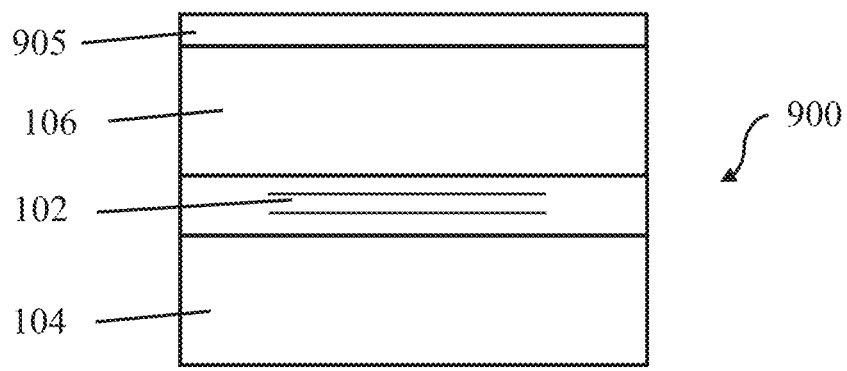
FIG. 9 shows a schematic cross-sectional view of an example pcLED similar or identical to that described above with respect to FIG. 1, but further comprising an interferometric photonic bandgap filter.

FIG. 9 shows a schematic cross-sectional view of an example pcLED 900 similar or identical to that described above with respect to FIG. 1, but further comprising an interferometric photonic bandgap filter 905 that compensates for changes in performance of the pcLED compared to the performance of an earlier generation pcLED. In the example of FIG. 9 the interferometric photonic bandgap filter is disposed on a light output surface of wavelength converting structure 106, but in other variations the interferometric photonic bandgap filter may be spaced apart from the light output surface of the wavelength converting structure in the optical path of light emitted from and through the wavelength converting structure.

Figure 10:
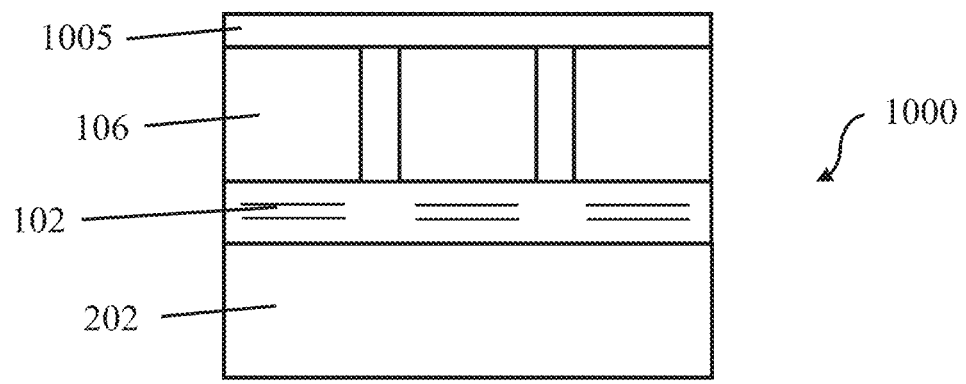
FIG. 10 shows a schematic cross-sectional view of an example array of pcLEDs similar or identical to that described above with respect to FIG. 2A, but further comprising a shared interferometric photonic bandgap filter.

FIG. 10 shows a schematic cross-sectional view of an example array 1000 of pcLEDs similar or identical to that described above with respect to FIG. 2A, but further comprising a shared interferometric photonic bandgap filter 1005 that compensates for changes in performance of the pcLED compared to the performance of an earlier generation pcLEDs. In the example of FIG. 10 the interferometric photonic bandgap filter is disposed on light output surfaces of the pcLED wavelength converting structures 106, but in other variations the interferometric photonic bandgap filter may be spaced apart from the light output surfaces of the wavelength converting structures in the optical path of light emitted from and through the wavelength converting structures.

In yet other variations each LED or pcLED in an array may have a corresponding separate interferometric photonic bandgap filter as in the example of FIG. 9.

As summarized above, generally a method for designing and manufacturing a filter having the desired compensatory optical filtering properties initially comprises characterizing the optical performance of the next generation device and the optical performance of the legacy device by characterizing output flux from the devices as a function of wavelength and angle of emission.

Next, an optical filter template is developed. The optical filter template is a mathematical model characterizing transmission as a function of wavelength and angle of incidence for a filter that is intended to filter the light output from the next generation device to provide a filtered output matching the light output characteristics of the legacy device. The template may be developed using conventional numerical techniques, for example.

Next, one or more mathematical models of candidate interferometric photonic bandgap filters are designed to perform similarly to the optical filter template. The models characterize the refractive index, extinction coefficient (preferably 0), optical thickness, and physical thickness of each layer in a stack of layers in the filter as these properties vary through the stack. Generally, there is more than one such interferometric photonic bandgap filter that will perform similarly to the optical filter template. Conventional methods for interferometric photonic bandgap filter design with commercially available design software may be used, guided by the optical filter template.

Figure 11:
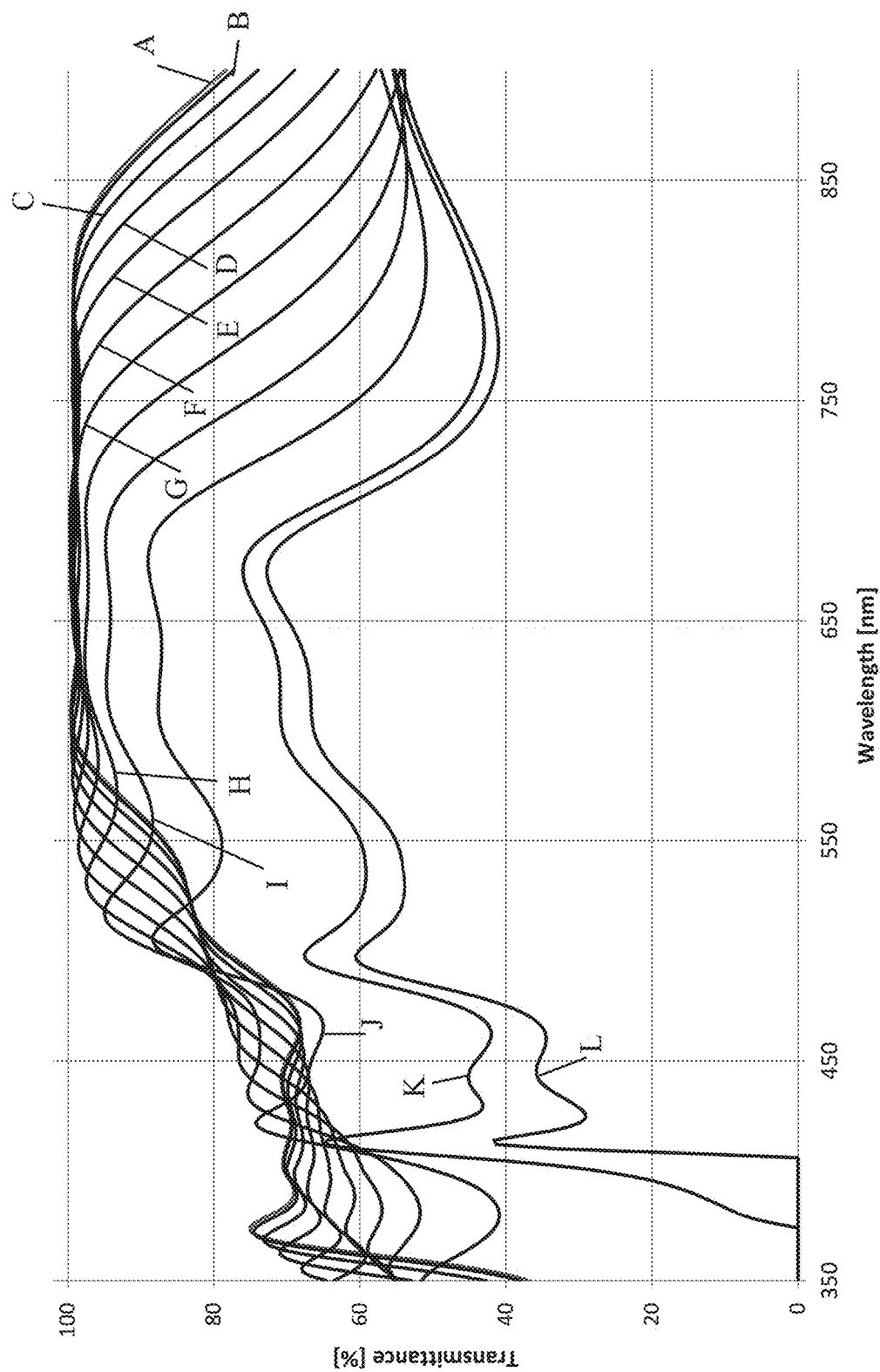
FIG. 11 shows transmission as a function of angle and wavelength for an example model interferometric photonic bandgap filter.

FIG. 11 shows transmission as a function of angle and wavelength for an example model interferometric photonic bandgap filter comprising a stack of alternating layers of silicon oxide and niobium pentoxide of varying thicknesses. In this figure, reference letters A-L identify the transmission curves by angle of incidence as follows: A=0°, B=4.34°, C=8.62°, D=12.77°, E=16.74°, F=20.45°, G=23.82°, H=26.78°, I=29.24°, J=31.12°, K=32.36°, and L=32.5°.

Next, the performance of each candidate interferometric photonic bandgap filter is assessed by comparing the (calculated) filtered output of the next generation device to the angle and wavelength dependent output of the legacy device to determine which candidate interferometric photonic bandgap filter provides a filtered output that best matches the output from the legacy device. The closeness of the match may be assessed, for example, for forward gain, FWHM, color over angle, total flux, or any combination thereof.

A good match for forward gain is, for example, within +/−0.5%.

A good match for FWHM is, for example, within +/−0.5 degrees.

A good match for color over angle is, for example, a color over angle dy for the filtered output that differs from the dy of the legacy device output by less than 10 points, where dy is the difference between the largest y value and the smallest y value in color over angle for a device's output.

A good match for total flux is, for example, +/−0.5%.

One or more of the candidate interferometric photonic bandgap filters providing a good match may then by manufactured by conventional methods known to one of ordinary skill in the art.

Generally, the interferometric photonic bandgap filters will comprise a stack of alternating layers of two or more materials with low (e.g., $SiO_2$) and high (e.g., $Nb_2O_5$, $Ta_2O_5$, $TiO_2$, . . . ) refractive indices. Individual layer thicknesses may be, for example, about 10 nm to about 200 nm. Layer thickness may vary through the stack. Typically the stack will comprise 20 to 30 layers, but up to about 100 layers may be used in complex designs. The total thickness of the stack of layers may be, for example about 1 micron to about 2 microns, or about 1 micron to about 10 microns. Individual layers in the stack may be deposited by, for example, magnetron sputtering or reactive sputtering using commercially available equipment.

Operation of the filters is based on constructive and destructive interference of light waves reflected and transmitted through the interfaces between adjacent layers in the stack. The wavelength and angular dependence of transmission through the filters depends on the refractive indices, extinction coefficients, and thicknesses of the layers as well as on the number of layers in the stack.

The filter design strategy may enable the independent control of the follow emitter characteristics:
Flux levels,
Angular radiation characteristics: FWHM, forward gain,
Color over angle radiation characteristics,
within, for example, the ranges listed in table below.

|  | Flux (%) | Forward Gain (%) | FWHM (deg) | CoA (pts) |
| --- | --- | --- | --- | --- |
| Control marging | 0%:−10% | +/−25% | +/−15 deg | +/−40 |

Interferometric photonic bandgap filters as used herein may be designed to demonstrate a wide range of independent control over main characteristics such as flux. This is possible by engineering complex spectral and angular filter responses such as illustrated in FIG. 11. It may be important to be able to control the following characteristics of the spectral response: transmission levels in the blue, green and red regions with stair-case and sloped templates, band separation into at least 4 spectral regions: blue, green, yellow and red. In addition, it may be important to control the adjustable transmission delta difference T(oblique angle)−T(normal incidence) in various spectral regions in the visible range.

This disclosure is illustrative and not limiting. Further modifications will be apparent to one skilled in the art in light of this disclosure and are intended to fall within the scope of the appended claims.

What is claimed is:

1. A method comprising:
obtaining angle and wavelength dependent flux data characterizing a light output radiation intensity pattern through a light output surface of a first light emitting device during operation of the first light emitting device, the first light emitting device comprising a light emitting semiconductor diode structure and a wavelength converting structure;
obtaining angle and wavelength dependent flux data characterizing a light output radiation intensity pattern through a light output surface of a second light emitting device during operation of the second light emitting device, the second light emitting device comprising a light emitting semiconductor diode structure and a wavelength converting structure;
determining or having another determine angle and wavelength dependent transmission properties characterizing an optical filter configured to filter the light output radiation intensity pattern of the second light emitting device to provide a filtered light output radiation intensity pattern characterized by angle and wavelength dependent flux data matching the angle and wavelength dependent flux data characterizing the light output radiation intensity pattern of the first light emitting device; and
manufacturing or having another manufacture an interferometric photonic bandgap filter having the determined angle and wavelength dependent transmission properties.

2. The method of claim 1, wherein the filtered light output radiation intensity pattern has a total flux that is reduced compared to that of the light output radiation intensity pattern of the second light emitting device.

3. The method of claim 1, wherein the filtered light output radiation intensity pattern has a full width at half maximum angle that is increased compared to that of the light output radiation intensity pattern of the second light emitting device.

4. The method of claim 1, wherein the filtered light output radiation intensity pattern has a full width at half maximum angle that is decreased compared to that of the light output radiation intensity pattern of the second light emitting device.

5. The method of claim 1, wherein the filtered light output radiation intensity pattern has a full width at half maximum angle that is within +/−15 degrees of the light output radiation intensity pattern of the second light emitting device.

6. The method of claim 1, wherein the filtered light output radiation intensity pattern has a forward gain that is increased compared to that of the light output radiation intensity pattern of the second light emitting device.

7. The method of claim 1, wherein the filtered light output radiation intensity pattern has a forward gain that is decreased compared to that of the light output radiation intensity pattern of the second light emitting device.

8. The method of claim 1, wherein the filtered light output radiation intensity pattern has a forward gain that that is within +/−25% of that of the light output radiation intensity pattern of the second light emitting device.

9. The method of claim 1, wherein the filtered light output radiation intensity pattern has decreased uniformity of color over angle compared to that of the light output radiation intensity pattern of the second light emitting device.

10. The method of claim 1, wherein the filtered light output radiation intensity pattern has increased uniformity of color over angle compared to that of the light output radiation intensity pattern of the second light emitting device.

11. The method of claim 1, wherein the filtered light output radiation intensity pattern has color over angle within +/−40 points of that of the light output radiation intensity pattern of the second light emitting device at all angles.

12. A light emitting device comprising:
a light emitting semiconductor diode structure;
a wavelength converting structure disposed on a light output surface of the semiconductor diode structure; and
an interferometric photonic bandgap filter disposed in an optical path of light output through a light output surface of the wavelength converting structure during operation of the light emitting device, the interferometric photonic bandgap filter characterized by spectral transmission characteristics that vary with wavelength through the visible spectrum and with angle with respect to a normal to a plane of the light output surface of the wavelength converting structure to, during operation of the light emitting device,
increase the full width at half maximum of an angular radiation intensity pattern of light output from the light emitting device, or
decrease the forward gain of an angular radiation intensity pattern of light output from the light emitting device, or
decrease uniformity of color over angle of light output from the light emitting device, or
any combination thereof,
compared to an otherwise identical light emitting device lacking the interferometric photonic bandgap filter.

13. The light emitting device of claim 12, wherein the interferometric photonic bandgap filter is disposed on the light output surface of the wavelength converting structure.

14. The light emitting device of claim 12, wherein the interferometric photonic bandgap filter is spaced apart from the light output surface of the wavelength converting structure.

15. The light emitting device of claim 12, wherein the interferometric photonic bandgap filter is characterized by spectral transmission characteristics that vary with wavelength through the visible spectrum and with angle with respect to a normal to a plane of the light output surface of the wavelength converting structure to reduce the total flux of light output from the light emitting device during operation of the light emitting device, compared to an otherwise identical light emitting device lacking the interferometric photonic bandgap filter.

16. The light emitting device of claim 12, wherein the interferometric photonic bandgap filter increases the full width at half maximum of the angular radiation intensity pattern of light output from the light emitting device during operation of the light emitting device, compared to an otherwise identical light emitting device lacking the interferometric photonic bandgap filter.

17. The light emitting device of claim 12, wherein the interferometric photonic bandgap filter decreases the forward gain of the angular radiation intensity pattern of light output from the light emitting device during operation of the light emitting device, compared to an otherwise identical light emitting device lacking the interferometric photonic bandgap filter.

18. The light emitting device of claim 12, wherein the interferometric photonic bandgap filter decreases uniformity of color over angle of the light output from the light emitting device during operation of the light emitting, compared to an otherwise identical light emitting device lacking the interferometric photonic bandgap filter.

19. An array of two or more of the light emitting devices of claim 12, wherein the light emitting devices are independently operable and share an interferometric photonic bandgap filter.

20. An array of two or more of the light emitting devices of claim 12, wherein the light emitting devices are independently operable and each light emitting device has an interferometric photonic bandgap filter not shared with any other of the light emitting devices.

* * * * *